US005609804A

United States Patent [19]

Alieri

[11] Patent Number: 5,609,804

[45] Date of Patent: Mar. 11, 1997

[54] PROCESS FOR DECORATING CERAMIC TILES

[75] Inventor: Rodiero Alieri, Imola, Italy

[73] Assignee: Sacmi Cooperativa Meccanici Imola S.c.r.l., Imola, Italy

[21] Appl. No.: 257,977

[22] Filed: Jun. 10, 1994

[30] Foreign Application Priority Data

Jun. 21, 1993 [IT] Italy ................................ BO93A0281

[51] Int. Cl.[6] ................................................ C04B 33/32

[52] U.S. Cl. ................................ 264/56; 264/60; 264/67; 264/131; 264/132; 264/162; 264/271.1; 156/89; 156/293

[58] Field of Search .................................... 428/156, 132, 428/167; 156/89, 63, 145, 153, 242, 257, 293; 264/56, 60, 67, 131, 132, 162, 271.1

[56] References Cited

U.S. PATENT DOCUMENTS

| | | | |
|---|---|---|---|
| 3,627,861 | 12/1971 | Timke | 428/49 |
| 4,810,539 | 3/1989 | Todd | 428/13 |

FOREIGN PATENT DOCUMENTS

| | | |
|---|---|---|
| 0066311 | 12/1982 | European Pat. Off. . |
| 0414149 | 2/1991 | European Pat. Off. . |
| 2572444 | 5/1986 | France . |
| 2646799 | 11/1990 | France . |
| 344203 | 3/1967 | Switzerland . |
| 9009359 | 8/1990 | WIPO . |

*Primary Examiner*—Donald Loney
*Attorney, Agent, or Firm*—Guido Modiano; Albert Josif

[57] ABSTRACT

Process for decorating ceramic tiles including the following steps: a) the pressing of powders so as to form a pressed item; b) the forming, during the pressing of the item, of recesses that affect the face that is meant to remain in view, these recesses being peripherally surrounded by a rim the extension whereof matches the contour of the decoration to be obtained; c) the application, in these recesses, of preset doses of mixtures and/or enamels of decorative material that have a fluid consistency that allows these mixtures to spread so as to cover the bottom of the recesses; and finally d) the final baking of the item.

14 Claims, 1 Drawing Sheet

PROCESS FOR DECORATING CERAMIC TILES

BACKGROUND OF THE INVENTION

The present invention relates to a process for decorating ceramic tiles and to tiles thus obtained.

Silk-screen printing techniques are currently used to decorate tiles with ornamental patterns; by means of these techniques, the colors are applied in the desired patterns on the surface of the pressed but as yet not baked tile or optionally on the pre-baked tile (the so-called "biscuit").

SUMMARY OF THE INVENTION

A principal technical aim of the present invention is to provide a process for decorating ceramic tiles that allows to manufacture products with new aesthetic characteristics that exceed those obtainable with conventional methods as regards both color and structural aspects.

A particular object of the present invention is to provide a process that allows to affect the surface characteristics of tiles as regards the requirements of resistance to wear and to external factors.

With this aim and this object in view there is provided, according to the present invention, a process for decorating ceramic tiles characterized in that it comprises the following steps:

a) the pressing of powders so as to form a pressed item;

b) the forming, during the pressing of the item, of at least one recess that affect the face that is meant to remain in view, said recess being peripherally surrounded by a rim the extension whereof matches the contour of the decoration to be obtained;

c) the application, in said recess, of preset doses of mixes and/or enamels of decorative material having a fluid consistency that allows said mixture to spread so as to cover the bottom of said recess; and finally d) the final baking of the item. An additional aim of the present invention is to provide a tile produced with the above described process.

BRIEF DESCRIPTION OF THE DRAWINGS

Further characteristics and advantages of the present invention will become apparent from the following detailed description of a preferred but not exclusive embodiment thereof, with reference to the accompanying drawing, wherein.

DESCRIPTION OF THE PREFERRED EMBODIMENTS

Figure 1:
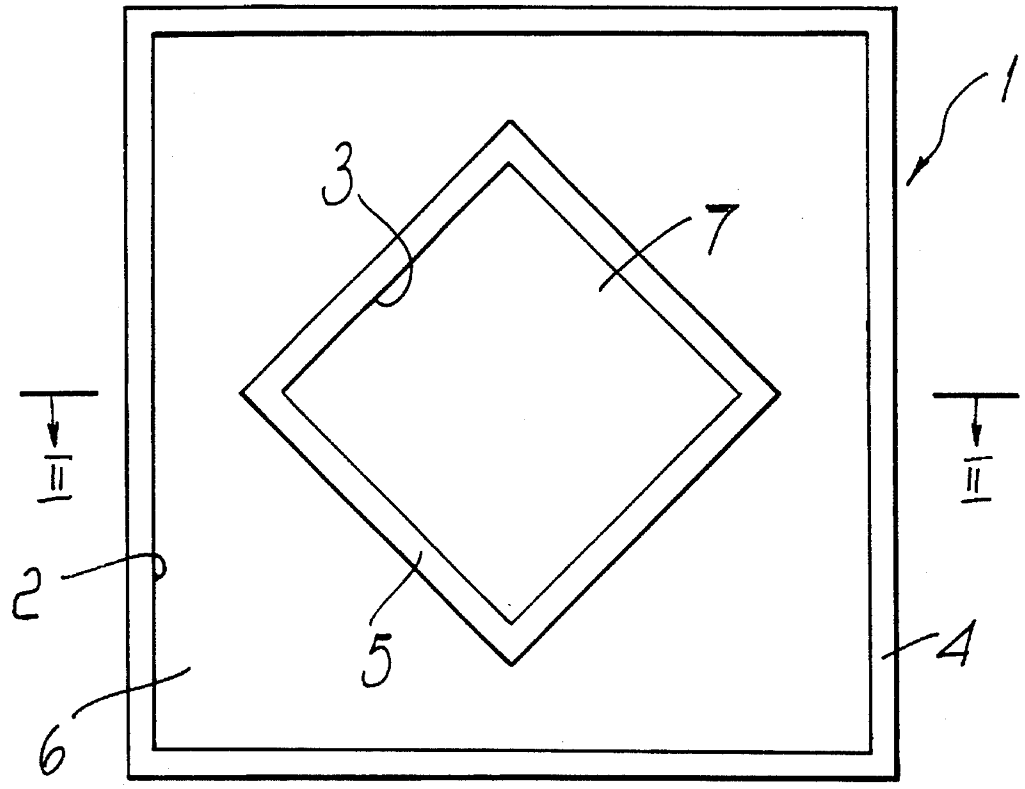
FIG. 1 is a plan view of a tile obtained with the process according to the present invention.

With reference to the above figures, the reference numeral 1 designates the substrate of a quadrangular tile, which is obtained by pressing powdery material in a normal mechanical or hydraulic press. Said substrate is hereinafter termed "pressed item" for convenience in description.

Recesses are formed in the face of the item that is meant to remain in view by providing corresponding raised portions on the active faces of the moving or fixed mold parts. The recesses may have any shape. For the sake of clarity in description, in the illustrated example there are two recesses 2 and 3: the recess 2 is surrounded by a peripheral rim 4 that runs along the sides of the tile 1, whereas the recess 3 is surrounded by an internal rim 5 which is diamond-shaped by way of example. After pressing, the item 1 is conveyed to a device for applying the decorative material, by means of which the recesses 2 and 3 are filled with respective doses of product that have a liquid or semi-liquid consistency. These doses match the volume of the respective recesses and are deposited in them by using volumetric dosage devices, for example of the piston type.

Advantageously, said product having a liquid consistency can be a barbotine of colored enamels or a mixture having such a flow ability as to expand in the recess until it reaches the level of the perimetric containment rim.

Once these preparatory steps have ended, the product (pressed item or biscuit covered with decorative material) is conveyed to a kiln to complete its baking, so that decorative tesserae 6 and 7 form in the recesses 2 and 3.

A peculiarity of the invention resides in the possibility of obtaining exposed surfaces at various levels, for example by varying the height of the peripheral rim of one recess with respect to the other.

Figure 2:
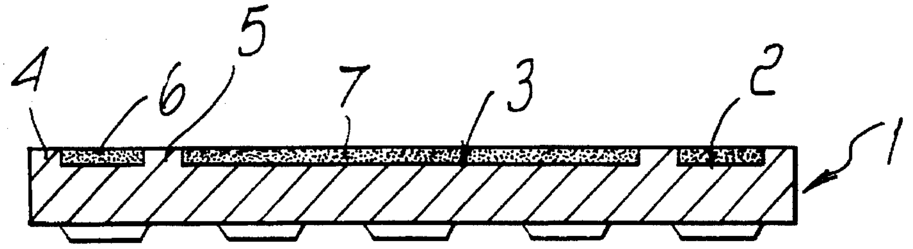
FIG. 2 is a sectional view of the tile of FIG. 1, taken along the transverse plane II—II.
Figure 3:
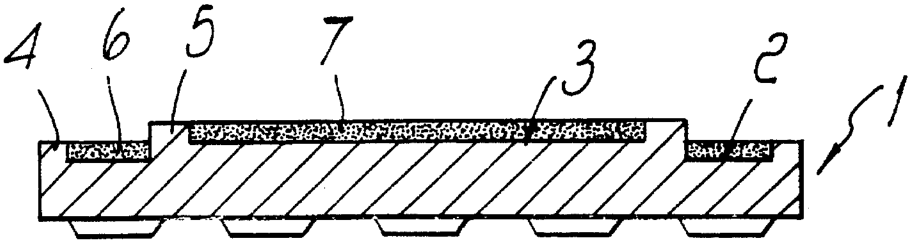
FIG. 3 is a sectional view of a different embodiment of the tile.

The embodiment of FIG. 3 illustrates a tile having the same pattern as the tile of FIGS. 1 and 2, but in which the inner rim 5 is higher than the peripheral rim 4 so as to obtain a central region that is raised with respect to the surrounding region and is capable of providing a plastic appearance.

The described invention is susceptible to numerous modifications and variations, all of which are within the scope of the same inventive concept.

For example, the pressed item can be pre-baked prior to the application of the decorative material. The tile thus obtained and decorated can be polished.

The decorative material is chosen according to the need to obtain firm anchoring to the support and so as to match the thermal expansion thereof.

In a preferred embodiment, the decorative material can have a semi-liquid or pasty consistency and the recesses can be filled by means of a presser that spreads the material into the smallest interstices or crannies.

The thickness of the rim that surrounds the recesses can vary as required according to the aesthetic requirements.

What is claimed is:

1. Process for decorating ceramic tiles, comprising the following steps:

a) pressing powders for forming a pressed item, said item comprising a decoratable surface;

b) forming on said surface, during the pressing step, at least one recess, said at least one recess being peripherally surrounded by rims, said rims having an extension which matches a contour of a decoration to be obtained;

c) preparing a decorative material product for application in said recesses, said product having a fluid consistency;

d) applying, in said recess, preset doses of said product having fluid consistency, said product spreading in said recess surrounded by said rims which have the extension matching said contour of a decoration;

e) baking said item, f) polishing said item for obtaining a finished decorated surface.

2. Process according to claim 1, wherein said pressed item is pre-baked (biscuit baking) prior to the application of the product.

3. Process according to claim 1, wherein said decorative material product is applied in said recesses for expanding to reach a level of said rims.

4. Process according to claim 1, comprising two recesses, the rims of said recesses being arranged at different levels.

5. Process according to claim 1, comprising at least two recesses, the rims of said recesses having different thickness.

6. Process according to claim 1, wherein said product having fluid consistency is selectable from a mixture of decorative materials and a barbotine of colored enamels, said step of applying said doses of product being carried out by means of volumetric dosage devices.

7. Process according to claim 6, wherein said mixtures of decorative materials and said barbotine of colored enamels have a pasty consistency which is in any case such as to ensure filling of the recesses.

8. Process for decorating ceramic tiles, comprising the following steps:

a) pressing powders for forming a pressed item, said item comprising a decoratable surface;

b) forming on said surface, during the pressing step, at least one recess, said at least one recess being peripherally surrounded by perimetric containment rims, said rims having variable height levels and an extension which matches a contour of a decoration to be obtained;

c) preparing a decorative material product for application in said recesses, said product having a fluid consistency;

d) applying, in said recess, preset doses of said product having fluid consistency, said product expanding in said recess to reach the height level of said containment rims for providing exposed surfaces at various levels;

e) baking said item.

9. Process according to claim 8, wherein said pressed item is pre-baked (biscuit baking) prior to the application of the product.

10. Process according to claim 8, wherein the tile is polished after baking.

11. Process according to claim 8, comprising two recesses, the rims of said recesses being arranged at different height levels.

12. Process according to claim 8, comprising at least two recesses, the rims of said recesses having different thickness.

13. Process according to claim 8, wherein said product having fluid consistency is selectable from a mixture of decorative materials and a barbotine of colored enamels, said step of applying said doses of product being carried out by means of volumetric dosage devices.

14. Process according to claim 13, wherein said mixtures of decorative materials and said barbotine of colored enamels have a pasty consistency which is in any case such as to ensure filling of the recesses.

* * * * *